United States Patent
Broekaert (10) Patent No.: US 9,285,849 B2
(45) Date of Patent: Mar. 15, 2016

(54) METHOD OF MANAGING THE ENERGY CONSUMPTION OF AN APPLICATION EXECUTABLE IN VARIOUS ENVIRONMENTS AND SOFTWARE ARCHITECTURE IMPLEMENTING SUCH A METHOD

(75) Inventor: Florian Broekaert, Gennevilliers (FR)

(73) Assignee: Thales, Neuilly sur Seine (FR)

( * ) Notice: Subject to any disclaimer, the term of this patent is extended or adjusted under 35 U.S.C. 154(b) by 267 days.

(21) Appl. No.: 13/997,145

(22) PCT Filed: Dec. 22, 2011

(86) PCT No.: PCT/EP2011/073768
§ 371 (c)(1),
(2), (4) Date: Jun. 21, 2013

(87) PCT Pub. No.: WO2012/085192
PCT Pub. Date: Jun. 28, 2012

(65) Prior Publication Data
US 2013/0290749 A1    Oct. 31, 2013

(30) Foreign Application Priority Data
Dec. 23, 2010    (FR) ...................................... 10 05092

(51) Int. Cl.
*G06F 1/26*      (2006.01)
*G06F 1/32*      (2006.01)
*G06F 9/48*      (2006.01)

(52) U.S. Cl.
CPC ............... *G06F 1/26* (2013.01); *G06F 1/3203* (2013.01); *G06F 1/324* (2013.01); *G06F 1/329* (2013.01);

(Continued)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12
USPC .......................... 713/300, 310, 320, 322, 323
See application file for complete search history.

(56) References Cited

U.S. PATENT DOCUMENTS 6,223,337 B1 *   4/2001   Blume .......................... 717/126
2006/0112377 A1   5/2006   Nacul et al.
(Continued)

FOREIGN PATENT DOCUMENTS

EP          1544716 A2    6/2005

OTHER PUBLICATIONS

Tommaso Cucinotta, et al., "On the Integration of Application Level and Resource Level QoS Control for Real-Time Applications", IEEE Transactions on Industrial Informatics, Nov. 1, 2010, pp. 479-491, vol. 6, No. 4, IEEE Service Center, New York, NY, USA, XP011318789.

(Continued)

*Primary Examiner* — Zahid Choudhury
(74) *Attorney, Agent, or Firm* — Baker & Hostetler LLP (57) ABSTRACT

The application being executable by hardware comprising a set of processors using an operating system, a method comprises at least the following steps: a first step of identifying the time constraints of the application; a second step of annotating code sections of the application that are subject to a time constraint, said annotating being performed by means of software markers, the software markers delimiting code segments; a third step of determining the worst case execution times of the segments in a given set of execution modes; a fourth step of memorizing the execution times of the segments in an execution library for each execution mode, said library being able to be interfaced with said hardware, said operating system and said application and to execute an energy management strategy by controlling the state of the processors.

9 Claims, 4 Drawing Sheets (52) U.S. Cl.
CPC ............ *G06F 1/3296* (2013.01); *G06F 9/4887* (2013.01); *G06F 9/4893* (2013.01); *Y02B 60/1217* (2013.01); *Y02B 60/1285* (2013.01); *Y02B 60/144* (2013.01)

(56) References Cited

U.S. PATENT DOCUMENTS

2007/0220530 A1    9/2007    Hsieh
2008/0313640 A1    12/2008    Liu et al.

OTHER PUBLICATIONS

Dong Li, et al., "Hybrid MPI/OpenMP Power-Aware Computing", 2010 IEEE International Symposium on Parallel & Dstributed Processing (IPDPS), Apr. 19, 2010, pp. 1-12, IEEE, Piscataway, NJ, USA, XP031679849.

Matthew M. Y. Kuo, et al., "Determining the Worst-Case Reaction Time of IEC 61499 Function Blocks", 2010 8th IEEE International Conference on Industrial Informatics, Jul. 13, 2010, pp. 1104-1109, IEEE, Piscataway, NJ, USA, XP031733593.

* cited by examiner

METHOD OF MANAGING THE ENERGY CONSUMPTION OF AN APPLICATION EXECUTABLE IN VARIOUS ENVIRONMENTS AND SOFTWARE ARCHITECTURE IMPLEMENTING SUCH A METHOD

CROSS-REFERENCE TO RELATED APPLICATIONS

This application is a National Stage of International patent application PCT/EP2011/073768, filed on Dec. 22, 2011, which claims priority to foreign French patent application No. FR 1005092, filed on Dec. 23, 2010, the disclosures of which are incorporated by reference in their entirety.

FIELD OF THE INVENTION

The present invention relates to a method for managing the energy consumption of an application that can be executed in different environments. It also relates to a software architecture implementing such a method.

BACKGROUND

Multiprocessor systems comprise increasingly complex applications requiring increasing computation performance levels. These increasing performance levels are reflected on the one hand in increasingly high operating frequencies and in an increase in the number of processors as well as associated circuits, such as memory circuits. These two types of increase are the reason behind an increasingly significant electrical consumption. This consumption is directly linked to the operating frequency of the processors, the number of processors and the power supply voltage.

In addition to the increase in energy consumption per se, there are at least two other associated drawbacks: on the one hand, the increased heat dissipation which affects the packaging of the hardware, possibly resulting in a redimensioning thereof, and on the other hand a reduction in hardware energy autonomy time.

The known solutions dealing with the issue of energy management in digital systems are focused mainly on the specification of the task scheduling module, also called scheduler, as well as on the energy management strategy ("scheduling algorithm") which has to be applied. In a real-time context, the software architectures are often dimensioned for the worst case according to the applications supported and the time constraints to be observed. The dimensioning phase notably characterizes each task by a worst case execution time, called WCET. Once the WCET's of the different tasks have been computed, the processors with which the WCET's can be observed are defined.

Algorithms and heuristics, relying for example on mechanisms called DVFS (Dynamic Voltage and Frequency Scaling) or low-consumption modes of the components, are proposed. The solutions of DVFS type notably exploit the time excesses relative the WCET's to lower the frequency and the voltage of certain resources. Other algorithms are based on the so-called DPM (Dynamic Power Management) techniques that notably exploit periods of inactivity.

The information necessary to the energy management module, a function performed by the scheduler, are described in the prior solutions. Such information notably includes the time characteristics of the application, the processor load or even the states of the processors. However, the manner in which such information is recovered is not specified. Now, in the implementation phase on a target, the issue of the interfaces and of the communication means arises.

This aspect is all the more important if the aim is to propose a solution that can be operated easily on a number of hardware platforms with different operating systems (OS). In practice, in this case, it is necessary to define interfaces and a communication means which is as generic as possible, that is to say, in other words, that can be adapted to a maximum of platforms.

Currently, the energy management is more often than not taken into account at the end of the product development cycle. It is therefore important for the mechanisms proposed by this energy management to have a minimum impact on the way in which the applications are implemented. To deal with this point, the prior art does not propose any solution. In particular, in the operating systems, it is not yet standardized for the applications to communicate, during their execution, time information to the engine, or execution library, also called "runtime", necessary to an adequate energy management.

One of the difficulties in the use and implementation of energy management algorithms lies in the provision for the "runtime", during the execution of the applications, of relevant application and hardware component information, notably time and processor states information. Based on such information, many heuristics and energy management strategies can then be actually deployed. Thus, what may be considered in the prior art to be a directly useable input is therefore not however an immediate concept to be implemented. In particular, the measurement of the WCET is not information that is easy to obtain. The communication between the application and the real-time execution in low-consumption mode (by activating the energy management techniques) must then have a minimum impact on the original implementation of the application to avoid requiring a complete restructuring of the application code. As indicated previously, improving the energy consumption is an issue which is addressed at the end of product development and thus generally entails working with the existing structures.

The prior art therefore presents notably the following drawbacks:

- a lack of details on the communication means, in particular the interfaces, between the application and the energy management module, the scheduler, between the hardware platform and the energy management module and between the operating system and the energy management module;
- no appropriate processing of the impact of the energy management on the application development;
- a lack of details for the solutions to be able to be implemented directly in an operating system;
- no information for the solutions to be able to implemented easily on different hardware targets and operating systems (portable solution);
- no information on how to obtain an estimation of the WCET.

SUMMARY OF THE INVENTION

One aim of the invention is to mitigate the abovementioned drawbacks. To this end, the subject of the invention is a method for managing the energy consumption of a given application, said application being executable by hardware comprising a set of processors using an operating system, said method comprising at least the following steps:

a first step of identifying the time constraints of the application;

a second step of annotating code sections of the application that are subject to a time constraint, said annotating being performed by means of software markers, the software markers delimiting code segments;

a third step of determining the worst case execution times of the segments in a given set of execution modes;

a fourth step of memorizing the execution times of the segments in an execution library for each execution mode, said library being able to be interfaced with said hardware, said operating system and said application and to execute an energy management strategy by controlling the state of the processors.

Also the subject of the invention is a software architecture comprising hardware including a set of processors, an operating system and an application, said application being executed by the hardware using the operating system, said software comprising an execution library which can implement the method as described above.

BRIEF DESCRIPTION OF THE DRAWINGS

Other features and advantages of the invention will become apparent from the following description given in light of the appended drawings which represent.

DETAILED DESCRIPTION

Figure 1:
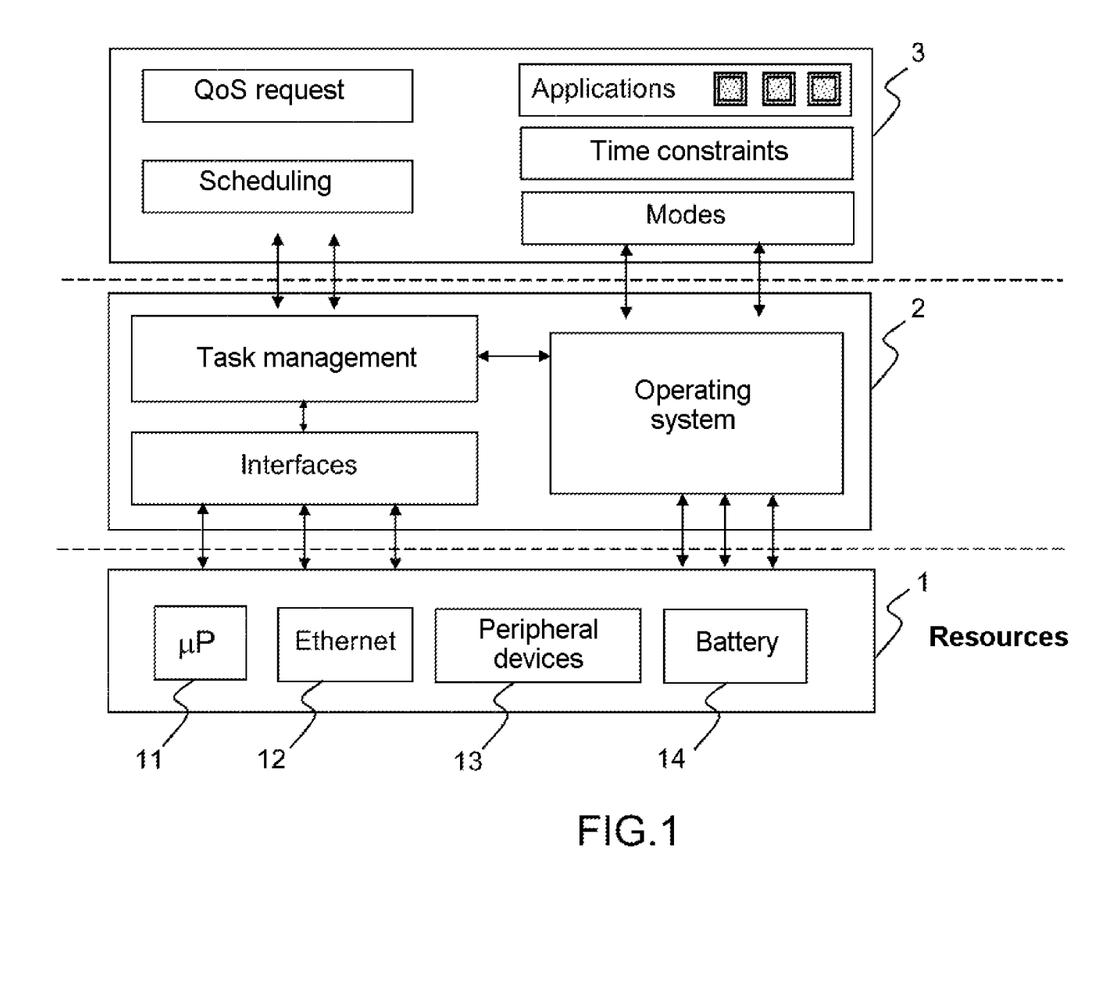
FIG. 1, an overview of the main layers that make up an embedded system.

FIG. 1 presents an overview of the three layers that make up a conventional embedded system. The first layer 1 consists of the hardware. This hardware comprises the resources of the application. The resources are notably made up of processors 11, possibly an Ethernet port 12, peripheral devices 13 as well as one or more batteries 14.

The second layer 2 corresponds to the operating system. This contains three main services. The task scheduler 21, communicating with an interface driver module 22 and an event observation module. These three services are necessary for an energy management strategy to be put in place.

The third layer 3 is made up of the application system, comprising the various applications to be implemented. Conventionally, the operating system enables the application system to operate with the resources.

Figure 2:
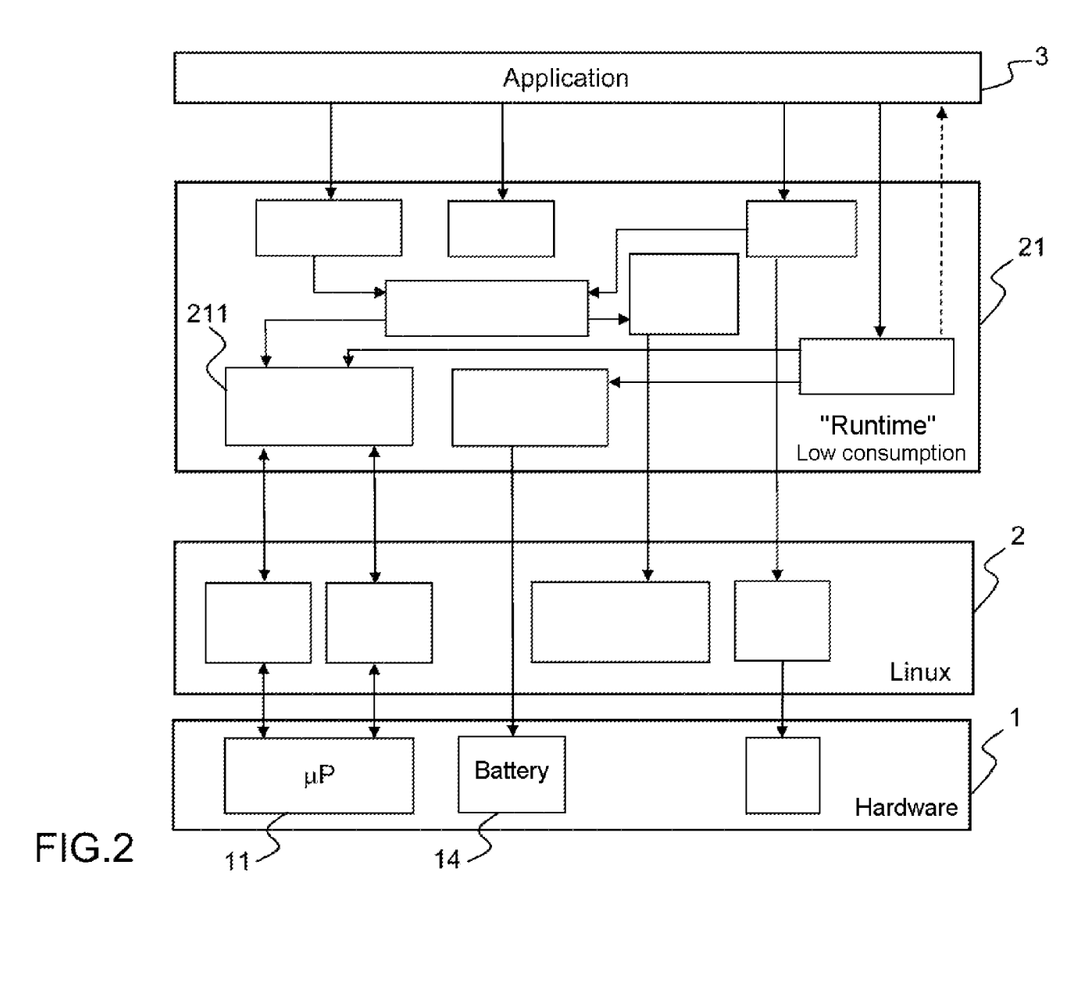
FIG. 2, an illustration of a software architecture that can implement the method according to the invention.

FIG. 2 presents a low-consumption software architecture according to the invention. More particularly, the software architecture according to the invention uses a specific execution library 21, or "runtime", that enables the applications that are interfaced with this library to operate in low-consumption mode. This so-called low-consumption execution library 21 can be coupled to the three layers 1, 2, 3 of a conventional embedded system as illustrated in FIG. 1. In the software architecture of FIG. 2, the operating system 2 used is, for example, the Linux system.

The execution library 21 forms a modular environment made up of API (interfaces) and software components enabling the applications 3 that register within this library to benefit from energy consumption reduction strategies without their performance levels being degraded. This environment is based on interfaces and communication means enabling it to be portable to different hardware platforms and different operating systems.

A software architecture according to the invention as illustrated defines interfaces between:

the application 3 and the low-consumption execution library, or "runtime", 21, the low-consumption execution library 21 and the operating system 2;

the low-consumption execution library 21 and the hardware, or the resources, 1.

With respect to the interfaces between the application 3 and the low-consumption execution library 21, they are based notably on an extension of the POSIX library to be interfaced easily with the software development methods commonly used.

According to the invention, a specific structure is used in order to communicate the time information of the application 3 to the execution library 21 and measure that information. This structure relies on the creation of code sections, described hereinbelow.

With the measurement information, it is then possible to apply a consumption reduction strategy. In this way, it is also possible to easily recover the worst case execution times (WCET). Thus, by these interfaces:

the application 3 can register its time constraints with the execution library, or "runtime", 21;

the "runtime" is able to know accurately where the program is in its execution, this information then being able to very useful to take consumption management decisions;

it is possible to closely follow the execution of an application and communicate this information to the scheduler;

it is possible to develop strategies for reducing the energy consumption of embedded equipment including real-time software by the use of mechanisms of the DVFS or DPM type by the scheduler.

With regard to the interfaces between the "runtime" 21 and the operating system 2, the use of the POSIX library makes the software architecture of FIG. 2 portable to different operating systems that are compatible with POSIX.

With regard to the interfaces between the "runtime" 21 and the hardware 1, a model of the hardware platform and of its energy behaviors is introduced. An abstraction of the consumption states of the different components of the hardware, notably of the processors, is therefore proposed. This model can be applied to all the components of the system which incorporate different energy modes. This thus makes the software architecture readily portable to different platforms.

The consumption reduction strategy then relies on a multiprocessor scheduling algorithm that makes it possible to guarantee a real-time scheduling while using precisely the level of resources needed. The proposed solution can then be a scheduling algorithm of DVFS type that can be combined with information originating from the battery 14 or from any other energy source.

Figure 3:
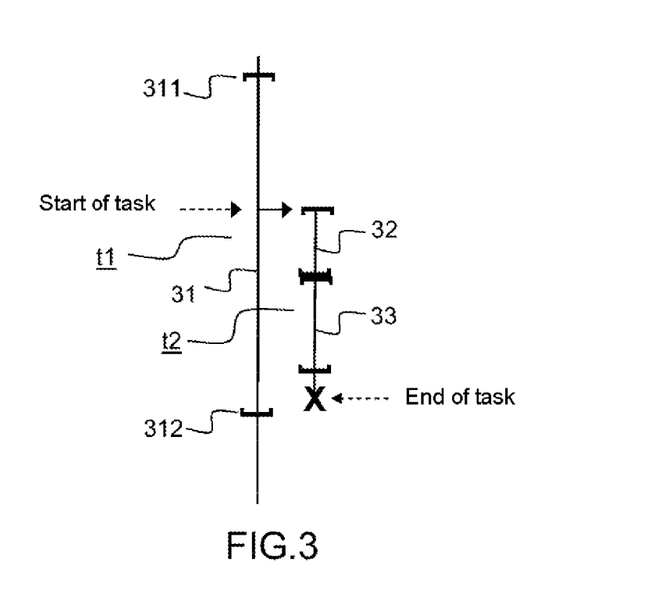
FIGS. 3 and 4, examples of definition of segments in application code sections.

FIG. 3 illustrates a feature of the invention, more particularly the creation of segments 31, 31, 33, a segment corresponding to a code section subject to time constraint. Each segment has an associated time. A segment 31 therefore corresponds to an execution code section which is delimited by two markers 311, 312, this marking being done by dedicated functions. The segments are notably introduced because of the fact that the duration of the POSIX tasks, which constitute a program, cannot be predefined. With the segments 31, 32, 33, it is possible to subdivide a complete task t1, t2 into a number of code sections, each section corresponding to a segment. The markers delimiting the segments are chosen in such a way as to be able to associate notably time and performance characteristics. Time constraints can thus be associated with programs, each time constraint having a start and an end, this start and this end also delimiting a segment. In other words, a segment is characterized by its execution time and can therefore be associated with an observed maximum time constraint.

In the case of FIG. 3, the task t1 may comprise a number of segments, but only one segment 31 is presented. Another task t2 may be competing with a task t2. The latter is subdivided into two successive segments 32, 33. The end of task t2 not necessarily corresponding with the end of the second segment 33.

Figure 4:
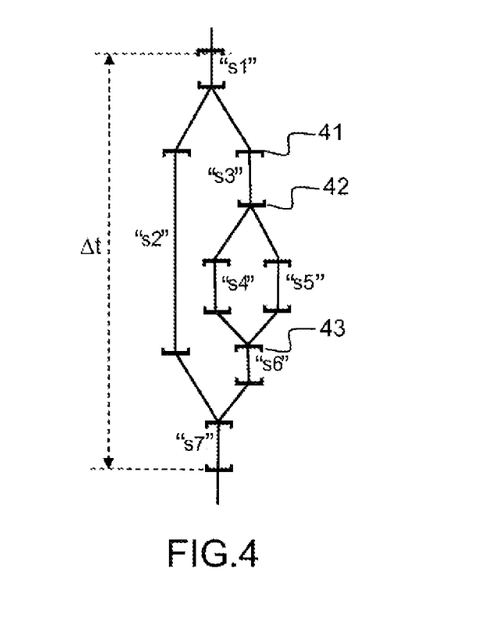

FIG. 4 presents a task comprising a number of branches, illustrating a case where the task arrives at a conditional branch), the branches being subdivided into segments s1, s2, s3, s4, s5, s6, s7, each segment having a start marker 41 and an end marker 42. The markers are for example placed at specific points. They are for example placed at tests 41 conditioning the transition to one code section or another, and at points 43 where the two conditional sections join. The set of segments s1, s2, s3, s4, s5, s6, s7 is placed between the start and the end of a time constraint At which is associated with the task as a whole.

The use of a number of segments to describe the time performance levels of certain program portions subject to constraint is highly advantageous. In particular, different branches of the program may present variable complexities. Consequently, the different branches of the program may vary significantly in terms of execution times. Controlling the execution time of the segments makes it possible to optimize not only the execution time a posteriori, but also instantaneously. It is possible to dynamically update the maximum remaining execution time for a program section subject to time constraint.

We now return to the software architecture of FIG. 2, describing the functionalities and interfaces that follow.

Launching the Application:

To launch the applications, a new argument is defined to be entered as a parameter. This argument is used to specify whether the "runtime" is activated and in what mode it is applied. The application is launched ("launch command") and comprises the following agreements.

```
"launch    *(--runtime_conf    [runtime_configuration])
[application]    *( application_args )"
```

The parameters are:
[runtime_configuration] (describing whether the runtime is to be activated and in what mode it is to be used);
[application] (name of the program to be executed);
[application_args] (POSIX standard arguments (POSIX argc, argv)).

Creating Tasks, Launching and Configuring:

For creating tasks, launching and configuring functions, the task interfaces of the POSIX standard are used as follows for example:

```
typedef void* (pthread_func)( void* );
        pthread_create( pthread_t* t, pthread_attr_t* attrib,
    pthread_func* f, void* args );
        pthread_attr_init( pthread_attr_t* );
        pthread_exit ( unsigned int );
```

To be able to take account of the segments 31, 32, 33, extensions of attributes of the POSIX tasks are defined. The attributes will notably make it possible to detect, in the tasks that make up the application, the program segments, in particular their start and their end.

Data structures and mechanism for communicating the requests and the times to the operating system 2:

Data Structure

Programming means must be defined that make it possible to give information as to the existence of segments 31, 32, 33 in the program and detect their start and their end.

The following data structures are provided in order to declare the segments according to the following primitive:

```
typedef struct pthread_segment {
    char* name;
    void* private;
};
```

The "private" pointer is an opaque structure introduced to transmit other attributes to the task segment if necessary. At this stage, only the name is associated with the segment. The instructions are, for example, as follows:

"int pthread_register_segment(pthread_segment* ps, char* name);

Arguments:
  name: new segment name
  private: user-managed data-structure.
Return value:
  0 if success
  !=0 if segment name has been already registered for the application"

Functions are also supplied to serve as segment start and end marker, that is to say, to mark the start and the end of the segments, in the implementation of a task. The instructions are, for example, as follows:

"int pthread_set_segment_name(pthread_t thread, char* name);

Arguments:
  thread: thread to associate the segment name to. Typically pthread_self( )
  name: name of the segment that is entered.
Return value:
  0 if success
  INVALID_THREAD if lifecycle of thread is inconsistent with setting a new segment to it.
  ETHREAD_SEGMENT_UNKNOWN if segment has not been registered before"

Time Characteristics of the Application

The time characteristics of the application are supplied. These characteristics are the execution times of the code segments 31, 32, 33 for different operating systems.

To this end, the following primitive can be defined, associating a segment execution time for a given system:

```
"int pthread_associate_segment_characteristic( pthread_segment* ps,
                                          unsigned        long
elem_computing_state,
timeval* min_duration,
timeval* max_duration);
```

Arguments:
  ps: pthread_segment instance managed by user
  elem_computing_state: index of performance mode for a given core (available in filesystem as described later on in the document).

min_duration/max_duration: minimum/maximum durations for executing the segment in the conditions of elem_computing_state.
Return value:
0 if success
EINVALID_MODE if elem_compute_state does is not recognized
EINVALID_SEGMENT if ps has not been declared
EINVALID_DURATIONS if min_duration>max_duration"

Time Constraints of the Application

The time constraints of the application are notably the time durations allocated for the different tasks leading to the task end limit dates.

The POSIX data structure sched_param is, for example, understood to be generic according to the following primitive:

```
"typedef struct sched_param {
    unsigned int sched_priority; // from standard POSIX
    void* private;
};"
```

The "private" pointer is an opaque structure introduced to transmit the task scheduling rules, notably the limit dates, according to the following instructions for example:

```
"typedef struct sched_param_deadline {
    timeval relative_deadline;
};
void sched_param_deadline_initialise( sched_param* s, timeval* rel_deadline );
void sched_param_deadline_finalise( sched_param* s );"
```

Alongside the limit dates, data structures used as inputs of the scheduler are, for example, defined specifically.

Scheduler Decisions at the Scheduling Points:

The scheduled entities correspond to the task segments. At each scheduling point, on completion of the execution of a code segment, a decision to change the states may be taken by the "runtime" 21. A state is notably defined by a voltage-frequency pair applied to a processor.

The states of the processors to be applied depend notably on the following parameters: the time allotted to the task, the duration of the task and its state of progress. The duration of the task can be defined by the segments. Depending on the outcome of a segment where the state of progress of a task is situated, the scheduler may decide to apply a given energy-saving strategy that is a function of the abovementioned parameters, that is to say define the state of the processor or of the hardware component that must be applied.

The "runtime" 21 comprises a module 211 for managing and modeling the state of the processors. This module 211 is interfaced with the processors 11 via the operating system. Its function is notably to place each processor in a given state of power and performance, for example in terms of voltage and frequency. A set of states is, for example, described in the module 211. A state is applied according to the strategies defined by the "runtime" 21. Advantageously, a step of generic modeling of the states of the processors can be carried out, the modeling of a processor describing its levels of performance in executing a code section of the application as a function of its power supply voltage and its frequency, the modeling being able to be adapted to different types of processors. This thus renders the proposed approach readily portable to different hardware targets.

Figure 5:
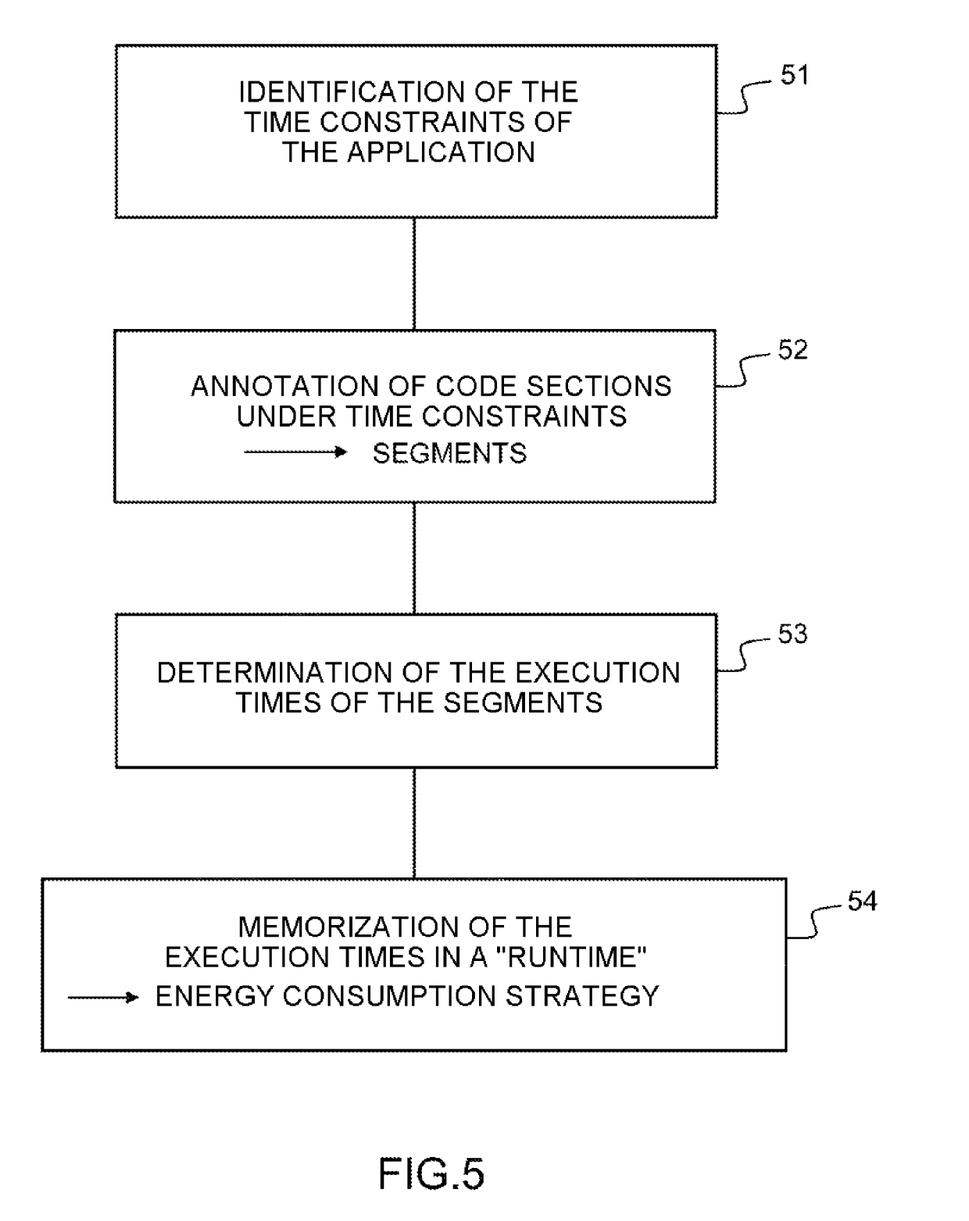
FIG. 5, a presentation of the possible steps for implementing the method according to the invention.

FIG. 5 illustrates the possible steps for implementing the method according to the invention, applied to a given application. This application can be executed by different types of hardware and operating systems. We take the example of the case of a software architecture as defined by FIG. 2.

The method comprises a first step 51 of identifying the time constraints of the application 1. To illustrate time constraints, a video application can be considered by way of example. In this case, a number of time constraints may be defined, dependent notably on the quality of service. It thus takes 40 milliseconds to decode an image if a rate of 25 images per second is requested. This time constraint may be lower if a lower quality of service is required.

The first step 51 is followed by a second step 52 of annotating the code sections of the application that are subject to time constraints. The annotating is done by the software marking of the code sections that are subject to time constraints. A code of the "set section name" type makes it possible to declare the start of the new segment for example.

These code sections, subject to time constraints, also have variable execution times. The software marks delimit the segments as illustrated by FIGS. 3 and 4. The knowledge of the worst case execution time of these segments will thereafter allow for an appropriate management energy consumption by adjusting the state of the processors.

A third calibration step 53 makes it possible to obtain the worst case duration of the sections defined in the preceding step. In this step, each processor executes the code sections in the possible different modes envisaged. These executions, which are carried out without imposing limit execution dates, make it possible to obtain the worst case execution times WCET for all the segments, in relation to each processor or processor model. This third calibration step 53, empirical, may be replaced by a step of determining the WCET's by an analytical study.

In a fourth step 54, the worst case execution times of the segments are memorized in the execution library 21, and for each execution mode retained.

By virtue of the segments within the application 3 that have been able to be defined during the second step 52, the execution library, or "runtime", 51 will have access to time information (these execution times) during the execution relating to this application.

Using this time information on the segments, consumption management strategies can then be deployed by "runtime" 21. The latter comprises a scheduler, the aim of which is notably to find the state of the processors that is best suited to execute a given task. This scheduler module can implement different scheduling strategies based on the knowledge of the WCET's of the segments that make up the different code sections that are subject to constraint.

Moreover, the modeling of the processors gives the "runtime" 21 an overview of the possible different states for the processors, that can be used for a strategy of DVFS or DPM type for example. This modeling of the processors is generic and thus makes it possible to be adapted easily to different types of architectures. It can also be applied to peripheral devices.

The invention advantageously makes it possible to ensure the portability of the solution to different operating systems by virtue of the extensions which have been defined notably for the Posix tasks.

The invention claimed is:
1. A method for managing energy consumption of an application, the application being executable by hardware comprising a set of processors using an operating system, the method comprising:

identifying time constraints of the application;

annotating code sections of the application that are subject to the time constraints, the annotating being performed by means of software markers, the software markers delimiting code segments;

determining worst case execution times of the code segments in a set of execution modes; and memorizing execution times of the code segments in an execution library for each execution mode, the library being able to be interfaced with hardware, the operating system, and the application and to execute an energy management strategy by controlling a state of the processors.

2. The method as claimed in claim 1, wherein the determining step is a calibration step wherein each processor executes the code sections without time constraint to determine a worst case length of execution of the code segments.

3. The method as claimed in claim 1, wherein the execution library controls the state of the processors according to DVFS technique, the state of a processor being defined by a power supply voltage and an operating frequency.

4. The method as claimed in claim 1, wherein the execution library controls the state of the processors according to DPM technique, the state of a processor being defined by a power supply voltage and an operating frequency.

5. The method as claimed in claim 1, wherein a POSIX task extension is included in the application to communicate the execution times to the execution library.

6. The method as claimed in claim 5, wherein attributes of the POSIX tasks extensions are defined, the attributes making it possible to detect a start and an end of the code segments of the application.

7. The method as claimed in claim 1, further comprising generically modeling the states of the processors, the modeling of a processor describing execution performance levels on the code section of the application as a function of a power supply voltage and a frequency, the modeling being able to be adapted to different types of processors.

8. The method as claimed in claim 1, wherein the hardware comprises a single processor.

9. A software architecture comprising hardware including a set of processors, an operating system, and an application, the application being executed by the hardware using the operating system, the software comprising an execution library which can implement the method as claimed in claim 1.

* * * * *